Nov. 24, 1931.                D. CRAIG                1,832,967
SEWAGE DISTRIBUTING PIPE
Filed April 7, 1928
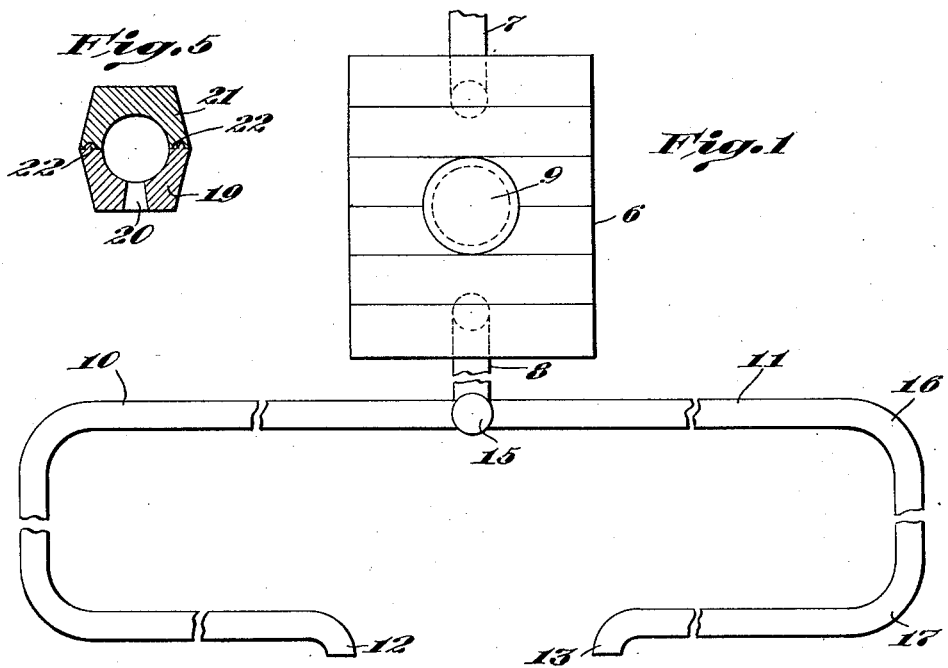
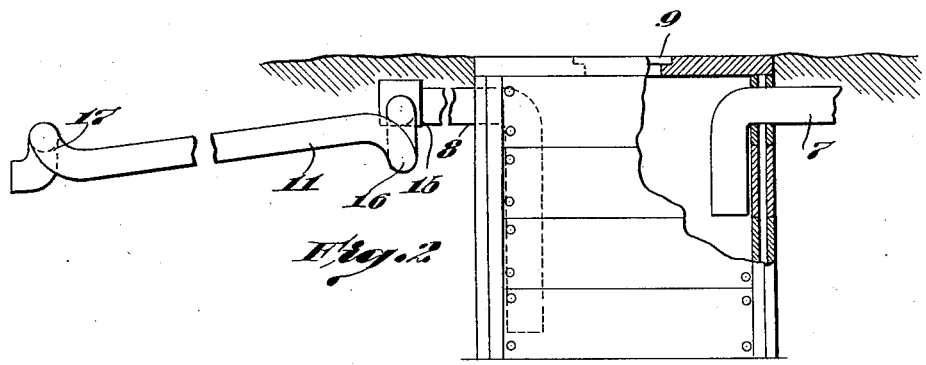
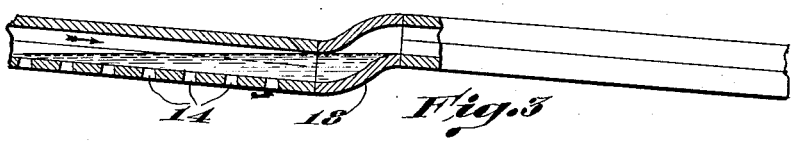
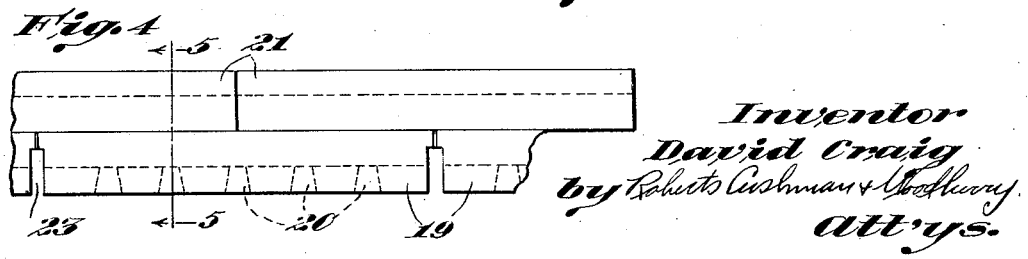
Inventor
David Craig
by Roberts Cushman & Woodbury
Att'ys.

Patented Nov. 24, 1931

1,832,967

UNITED STATES PATENT OFFICE

DAVID CRAIG, OF PEABODY, MASSACHUSETTS

SEWAGE DISTRIBUTING PIPE

Application filed April 7, 1928. Serial No. 268,128.

This invention pertains to sewage disposal systems and relates more particularly to improvements in the construction and arrangement of the distributing pipes which are adapted to carry the effluent from a septic tank or cesspool and to discharge the waste into the soil.

In the subterranean disposal of sewage waste it is highly desirable, if not quite necessary, that the tank effluent be delivered to the soil at points near the surface of the earth; for it is well known that the presence of the bacterial agents which act upon the sewage is confined within a layer extending only about two feet below the earth's surface. It is also desirable that the deposit be dispersed over a wide area, in order that relatively small quantities of the entire sewage waste may readily be absorbed at a multitude of separate points. Accordingly, it is a principal object of the present invention to provide an underground distributing pipe having a plurality of spaced discharge apertures, whereby the effluent may drain directly from the pipe into the soil at many separated points throughout the length of the pipe. Another object of the invention is to provide means within the pipe for retarding the flow of the effluent, in order to ensure substantially uniform distribution of the waste and to prevent a large quantity of the sewage from flowing through the pipe system and depositing at the open ends of the pipes.

Recommended embodiments of the invention are shown for the purpose of illustration in the accompanying drawings, in which, Fig. 1 is a plan view of a septic tank equipped with the improved distributing pipes;

Fig. 2 is a side elevation thereof, looking toward the left of Fig. 1;

Fig. 3 is an enlarged detail. partly in section, of the improved pipe structure, illustrating one means of retarding the flow of effluent;

Fig. 4 is an enlarged side elevation of an optional form of sectional pipe; and

Fig. 5 is a transverse section taken on the line 5—5 of Fig. 4.

The improved pipe system preferably leads from a septic tank 6, or other reservoir or trap, which may be buried in the ground with its top at or slightly below the surface, and which has an inlet pipe 7, adapted to convey sewage from the house, and an outlet pipe 8. The tank 6 may be of any desired construction and may have a clean-out manhole 9 in its top; the inlet pipe preferably enters the tank at the same level as, or slightly above, the outlet pipe, and the latter may extend downwardly within the tank, as indicated by the broken lines of Fig. 2, in order that the effluent of the tank, free from the accumulated surface scum, may readily flow from the outlet.

The main distributing pipe connects with the outlet pipe 8 and may have branches 10 and 11 extending underground and terminating in open ends 12 and 13 respectively. The length of the pipes and the number of its bends and branches will, of course, depend upon the nature of the terrain and the absorbent quality of the soil in which the pipes are laid. Any suitable material may be used in the manufacture of the pipes, such as iron, terra cotta or concrete; and the pipes may be made of such size as will meet the requirements of the particular installation.

The principal feature of this invention resides in the provision of apertures 14 (Fig. 3) in the pipe wall, which permit the effluent to drain into the soil at regularly spaced intervals along substantially the entire length of the pipe. The openings are preferably in the bottom of the pipe and closely spaced, but they may be disposed in the side walls of the pipe and may be spaced at a relatively greater distance, if desired. Such a construction ensures rapid drainage, absorption and decomposition of the effluent in the bacterial region of the ground adjacent the surface, and obviates the necessity of a large number of solid-walled branch-distributing pipes and the digging of a plurality of terminal cesspools.

The distributing pipes may be laid in relatively shallow trenches substantially parallel to the surface of the ground, or may be inclined from the horizontal. In order to retard the flow of effluent and ensure proper drainage through the apertures 14, the pipe sections are preferably so constructed as to provide barriers to the onward flow. This purpose may be satisfied by inclining certain of the pipe sections and upwardly offsetting the succeeding section by means of a connecting elbow. The upwardly bowed elbows may be at the bends 15, 16 and 17 of Fig. 2, or they may be introduced in a straight section of pipe, as at 18, Fig. 3. In either event, the partial obstruction to the passage of effluent causes a quantity of the waste matter to collect in the pipe sections ahead of the raised elbows, as indicated in Fig. 3. Such a feature has especial value when the ground surface slopes downwardly from the septic tank, for in such case most of the effluent would tend to flow past the apertures and out the ends of the inclined pipes, if no obstruction to the flow were provided.

A distributing pipe made of concrete sections is particularly suitable for the purposes of this invention, and such a structure, as illustrated in Figs. 4 and 5, may comprise bottom sections 19, having openings 20, and top sections 21. The upper sections may be properly centered upon the lower members by a tongue and groove union, as shown at 22 (Fig. 5). In addition to the apertures 20, other drainage openings 23 may be provided between the abutting ends of the bottom sections by cutting away a portion of the end faces thereof.

A distributing pipe constructed in any of the forms above described admirably fulfills the objects of this invention and provides a simple and economical means for the rapid and effective disposal of sewage. It will be understood, however, that particular details of structure may be varied to suit particular purposes without departing from the essence of the invention as defined in the following claim.

I claim:

In a sewage disposal system, an underground drainage pipe for distributing effluent from a tank, the pipe comprising a series of longitudinal sections and each section having a plurality of openings through its bottom, the openings being spaced at frequent longitudinal intervals intermediate the ends of the respective sections to allow a large portion of the effluent to drain into the soil from the sections near the tank as the effluent flows through the pipe, the sections being inclined downwardly from the horizontal in the direction of flow, and vertically inclined elbows connecting the lower end of certain sections with the higher end of the respective succeeding sections so that such succeeding sections are vertically offset from the plane of the preceding sections, substantially parallel thereto, whereby the flow of effluent is retarded to allow the absorption of the effluent into the soil beneath such preceding sections, and whereby the pipe may be disposed near the surface of the ground.

Signed by me at Boston, Massachusetts, this sixth day of April, 1928.

DAVID CRAIG.